US012235820B2

(12) United States Patent
Frantz, III et al.

(10) Patent No.: US 12,235,820 B2
(45) Date of Patent: Feb. 25, 2025

(54) MANAGING MULTI-TENANT KEYS IN MULTI-TENANT COMPUTING ENVIRONMENTS

(71) Applicant: Jive Software, Inc., Portland, OR (US)

(72) Inventors: William Frederick Frantz, III, Happy Valley, OR (US); David Edward Brown, Troutdale, OR (US)

(73) Assignee: Jive Software, Inc., Austin, TX (US)

( * ) Notice: Subject to any disclaimer, the term of this patent is extended or adjusted under 35 U.S.C. 154(b) by 379 days.

(21) Appl. No.: 15/583,473

(22) Filed: May 1, 2017

(65) Prior Publication Data

US 2018/0314723 A1 Nov. 1, 2018

(51) Int. Cl.
*G06F 16/22* (2019.01)
*G06F 16/21* (2019.01)
*G06F 16/25* (2019.01)
*G06F 16/28* (2019.01)

(52) U.S. Cl.
CPC ........ *G06F 16/2264* (2019.01); *G06F 16/211* (2019.01); *G06F 16/256* (2019.01); *G06F 16/283* (2019.01)

(58) Field of Classification Search
CPC .. G06F 17/2264; G06F 16/211; G06F 16/283; G06F 16/20; G06F 16/2264; G06F 16/256; G06F 16/264
USPC .......................................... 707/741; 797/741
See application file for complete search history.

(56) References Cited

U.S. PATENT DOCUMENTS

| 8,959,185 B2 * | 2/2015 | Nakil | H04L 41/0668 370/351 |
| 2012/0221694 A1 * | 8/2012 | Darcy | H04L 67/16 709/223 |
| 2017/0046373 A1 * | 2/2017 | Baker | G06F 16/214 |

OTHER PUBLICATIONS

International Search Report and Written Opinion dated Jul. 26, 2018, mailed in International Application No. PCT/US2018/030415, pp. 1-18.

(Continued)

*Primary Examiner* — Hosain T Alam
*Assistant Examiner* — Tracy M McGhee

(57) ABSTRACT

Technologies are described for managing multi-tenant identifiers (e.g., multi-tenant keys or multi-tenant database keys). Creating multi-tenant identifiers can comprise receiving a source system identifier from a source system, determining a source identity provider of the source system, creating a multi-tenant identifier representing a combination of the source system identifier and the source identity provider, and storing the created multi-tenant identifier. Using multi-tenant identifiers can comprise receiving a request to lookup a source system identifier, associated with a source system, in a multi-tenant identifier mapping table, determining a source identity provider of the source system, identifying an entry in the table with the source system identifier and the source identity provider, and returning a multi-tenant identifier associated with the identified entry in the table.

20 Claims, 11 Drawing Sheets

(56) References Cited

OTHER PUBLICATIONS

Xiaofeng, Guo et al. "Federated Content Rights Management for Research and Academic Publications Using the Handle System". D-Lib Magazine, Nov. 30, 2010, vol. 16, No. 11/12. DOI: 10.1045jnovember2010-guo . pp. 1-10.

Madsen, Paul. "Implications of Federated Identity Formats". Entrust, Apr. 30, 2004. Retrieved from www.infosecurityeurope.com/_novadocuments/26889?v=63500670040283000 . pp. 1-16.

International Search Report and Written Opinion dated Apr. 8, 2021, mailed in International Application No. 18726878.4, pp. 1-6.

\* cited by examiner

MANAGING MULTI-TENANT KEYS IN MULTI-TENANT COMPUTING ENVIRONMENTS

BACKGROUND

Users of a computing environment typically work with documents and resources available within the computing environment, such as the local network of a business or organization. However, users may also need to access external documents and resources. Typically, systems, such as database systems, create and manage their own unique identifiers that are local to the data stored within such systems. This presents a problem when data from one system is moved or accessed within another system. For example, the unique identifiers that are used within one system may conflict with the unique identifiers used within another system.

Therefore, there exists ample opportunity for improvement in technologies related to managing unique identifiers between different systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for creating and managing multi-tenant identifiers (e.g., multi-tenant keys or multi-tenant database keys). For example, a multi-tenant environment can receive unique identifiers (e.g., database keys or other unique identifiers) from a plurality of single-tenant systems. The multi-tenant environment can efficiently create multi-tenant identifiers that are unique within the multi-tenant environment. The received unique identifiers can be replaced with the multi-tenant identifiers for use within the multi-tenant environment.

For example, creating multi-tenant identifiers can comprise receiving a source system identifier from a source system, determining a source identity provider of the source system, creating a multi-tenant identifier representing a combination of the source system identifier and the source identity provider, and storing the created multi-tenant identifier.

As another example, using multi-tenant identifiers can comprise receiving a request to lookup a source system identifier, associated with a source system, in a multi-tenant identifier mapping table, determining a source identity provider of the source system, identifying an entry in the table with the source system identifier and the source identity provider, and returning a multi-tenant identifier associated with the identified entry in the table.

The foregoing and other objects, features, and advantages of the invention will become more apparent from the following detailed description, which proceeds with reference to the accompanying figures.

DETAILED DESCRIPTION

Figure 1:
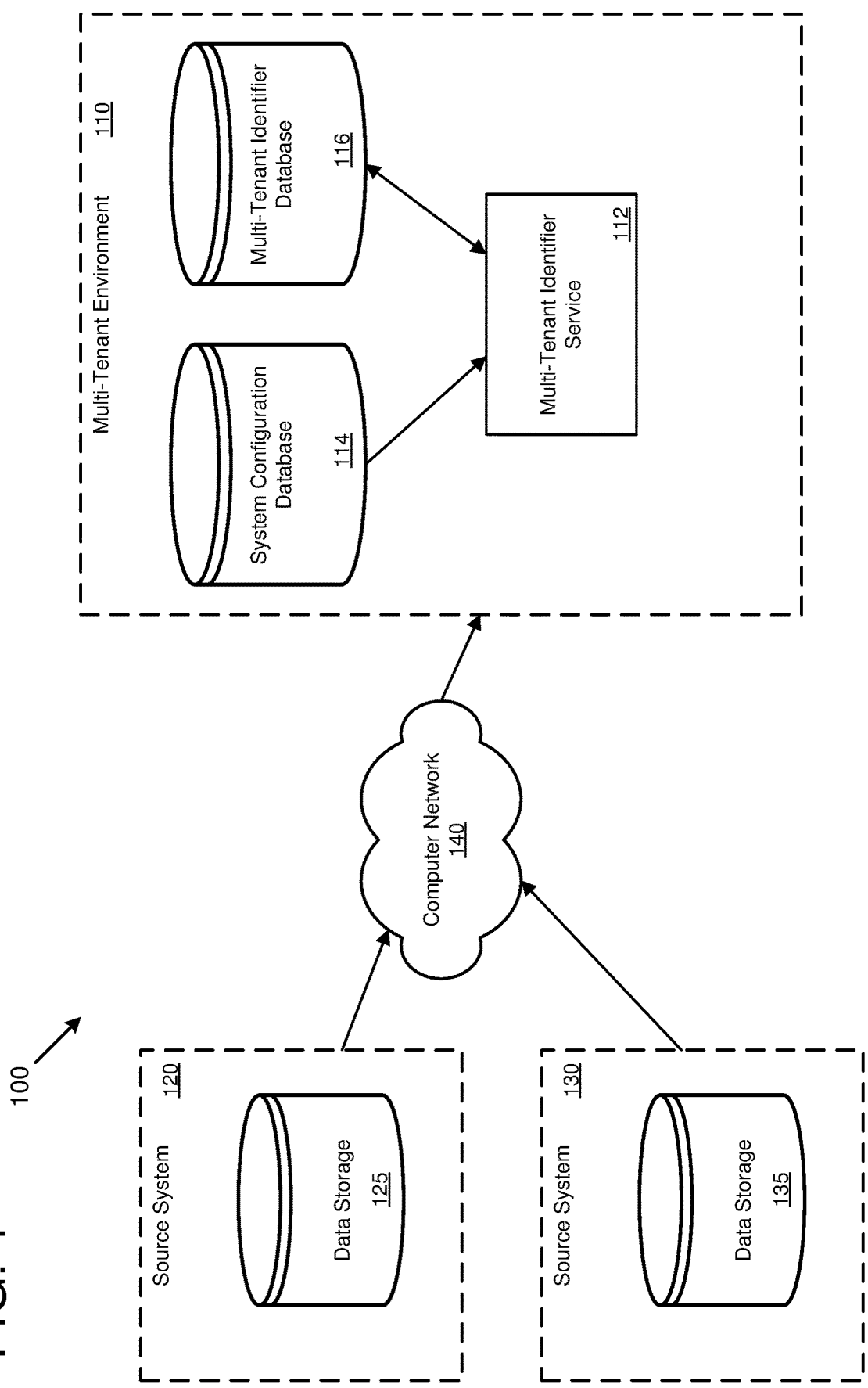
FIG. 1 is a diagram depicting an example environment for creating and managing multi-tenant identifiers.

The following description is directed to technologies for creating and managing multi-tenant identifiers (e.g., called multi-tenant keys or multi-tenant database keys). For example, a multi-tenant environment can receive unique identifiers (e.g., database keys or other unique identifiers) from a plurality of other systems (e.g., other single-tenant systems and/or multi-tenant). The multi-tenant environment can efficiently create unique multi-tenant identifiers that are unique within the multi-tenant environment. The received unique identifiers can be replaced with the multi-tenant identifiers for use within the multi-tenant environment.

In existing solutions, most systems create and manage their own unique identifiers that are used to locate their data. Because there is no coordination or standard between such systems for the generation of unique identifiers (e.g., each system runs its own database solution and database key scheme), conflicts between the unique keys in the individual systems can occur if the data is brought into a common environment. For example, if data from two separate systems is imported into a multi-tenant system, then conflicts between the unique identifiers used in each of the two separate systems can occur within the multi-tenant system. As an example, the same primary key (e.g., a value of 1234567) could be used to refer to a specific data item (e.g., a word processing document) in the first system and a different specific data item (e.g., a presentation file) in the second system. If both data items are imported into the multi-tenant system, then errors could occur (e.g., an error when importing the data items, an error when accessing the data items, the inability to access one or both data items, etc.).

In the technologies described herein, multi-tenant identifiers are created and managed. For example, multi-tenant identifiers can be created by a multi-tenant environment for data that is received (e.g., imported) into the multi-tenant environment from other systems (e.g., other single-tenant systems multi-tenant systems) which are also called source systems. The multi-tenant identifiers that are created by the multi-tenant environment are unique within the multi-tenant environment. Therefore, a unique identifier received from another system will not conflict with a unique identifier used within the multi-tenant environment, and a unique identifier received from one system will not conflict with a unique identifier received from a different system.

The multi-tenant identifier technologies can be applied to any type of unique identifier. Examples of unique identifiers include document identifiers, user identifiers, group identifiers, etc. Unique identifiers can be identifiers used in a database (e.g., database keys, such as primary keys).

In some implementations, source system identifiers are received from source systems and replaced with multi-tenant identifiers. A source system identifier refers to a unique identifier that is used by a source system to identify a user (e.g., a user identifier), document (e.g., a document identifier), database record (e.g., a database key), or other information. A source system identifier comprises a name (e.g., "primary key," "document identifier," "user name," "created by," etc.) along with a value of the unique identifier (e.g., a numeric value, an alphanumeric value, etc.).

In some implementations, source system identifiers are replaced with multi-tenant identifiers using a mapping table (also called a multi-tenant identifier mapping table). An entry in the mapping table includes the source identity provider (which uniquely identifies the source system and the identity provider used by the source system), the source system identifier name, the source system identifier value, and the multi-tenant identifier. The source identity provider (source idp) uniquely identifies a combination of the source system and the identity provider used by the source system. For example, a specific identity provider could service a number of source systems (e.g., the same Active Directory® identity provider could provide identity services to a number of source systems), or a specific source system could use a number of different identity providers (e.g., a first identity provider for user identifiers and a second identity provider for document identifiers). Table 1 below illustrates an example mapping table with one example entry. The example entry is for a source system identifier (in this example a source system identifier with the name of "Primary Key" and the value of 12345) from a specific source identity provider (in this example, identified as "Source1-idp1," which could be a specific SharePoint® system using a specific Active Directory system as its identity provider). If data matching the example entry is received by the multi-tenant environment, it would be mapped to the multi-tenant identifier (in this example the multi-tenant identifier is 1001). For example, if the multi-tenant environment receives a document (or metadata describing the document) from the source system Source1-idp1 that is identified using a primary key value of 12345, then the document identifier would be replaced with the multi-tenant identifier 1001 (e.g., in a database or content object referencing the document). The document would then be referenced using the multi-tenant identifier within the multi-tenant environment.

TABLE 1

Example Mapping Table

| Multi-tenant identifier | Source identity provider | Name | Value |
|---|---|---|---|
| 1001 | Source1-idp1 | Primary Key | 12345 |

Replacing source system identifiers with multi-tenant identifiers provides improvements in terms of computing resource utilization. For example, instead of creating a concatenated key (e.g., a key such as "Source1-idp1:Primary Key:12345"), a multi-tenant identifier can be created which is smaller and therefore can be stored and processed more efficiently (e.g., it uses less computer storage and requires fewer processing resources when performing comparisons or when transmitting via a network). In addition, the multi-tenant identifier does not contain any elements of the source system identifier or the source identity provider.

Replacing source system identifiers with multi-tenant identifiers can also provide improved security. For example, source system identifiers can contain personally identifiable information. By replacing such source system identifiers with multi-tenant identifiers (that do not contain any personally identifiable information), the personally identifiable information is not propagated within the multi-tenant environment.

The following description is also directed to technologies for managing metadata associated with external content. For example metadata can be obtained that describes content (e.g., documents, multimedia files, etc.) stored on external systems. The metadata can be obtained without locally storing the content items themselves. For example, the metadata can be retrieved from the external systems while the external content continues to be stored on the external systems. The metadata can also include indications of the actions that can be performed in relation to the external content. For example, actions can be obtained (e.g., locally determined and/or obtained from the external systems) and added to the metadata. The metadata can be stored and used locally. For example, the metadata can be used to locally perform the actions in relation to the external content. The metadata can also be used to locally initiate actions that are then carried out in the external systems.

The metadata can comprise permissions. For example, permission information can be received from the external systems and incorporated into the metadata (e.g., mapped to local user and/or group permissions needed to perform various actions in relation to the external content items).

The technologies for managing metadata provide benefits over previous solutions. For example, by not storing the external content items themselves locally (e.g., at the internal environment), computer storage usage can be reduced. In addition, if the content items themselves are not received, then network bandwidth usage can be reduced. Furthermore, by incorporating permissions from external systems, and enforcing those permissions within the internal environment, security and privacy of the external content items is enhanced.

Managing metadata can include creating and using multi-tenant identifiers. For example, multi-tenant identifiers can be created and used when metadata describing external content items is received and processed by the internal environment (which could be a multi-tenant environment). Multi-tenant identifiers can be created and used to replace source system identifiers present in the received metadata, including source system identifiers used for documents, user and group permissions, etc.

Example Environments for Creating and Managing Multi-Tenant Identifiers

In the technologies described herein, multi-tenant identifiers are created and managed. For example, multi-tenant identifiers can be created by a multi-tenant environment for data that is received by the multi-tenant environment from source systems (e.g., single-tenant systems). The multi-tenant identifiers that are created by the multi-tenant environment are unique within the multi-tenant environment.

FIG. 1 is a diagram depicting an example environment 100 for creating and managing multi-tenant identifiers. The example environment 100 includes a multi-tenant environment 110 (e.g., an internal environment). The multi-tenant environment 110 is operated by a collection of computing resources, such as server computers (e.g., database servers, search servers, content servers, web servers, etc.), networks and networking devices (e.g., routers, gateways, hubs, etc.), and user devices (e.g., desktop computers, laptops, tablets, phones, etc.). The internal environment 110 can be the computing environment of a particular business or organization.

The multi-tenant environment 110 receives and manages information and/or representations of information (e.g., external content items and/or metadata representing external content items) from a number of other systems, such as source system 120 and source system 130. The source systems 120 and 130 (e.g., external systems) are external and operated separately from the multi-tenant environment 110. In some implementations, the other systems 120 and 130 are operated by different businesses or organizations from the particular business or organization that operates the multi-tenant environment. The other systems 120 and 130 can be located remotely from the multi-tenant environment 110 (e.g., located in a different geographical location, such as a different state or country). While two source systems are depicted, an environment may have one or more source systems, and a given business or organization may operate one or more source systems.

The multi-tenant environment 110 is connected to the source systems 120 and 130 via a computer network 140. For example, the computer network 140 can comprise local area networks, wide area networks, the Internet, and/or other computer networks.

The multi-tenant environment 110 receives source system identifiers from the source systems 120 and 130. Because the source system identifiers may not be unique within the multi-tenant environment 110 (e.g., source system 120 and source system 130 could use the same unique identifier for different users, documents, or other entities or data), the source system identifiers are replaced within the multi-tenant environment 110 with multi-tenant identifiers.

The multi-tenant environment 110 includes a multi-tenant identifier service 112. The multi-tenant identifier service 112 can be a stand-alone software component (e.g., a software program or service) or integrated into other software or services of the multi-tenant environment 110. The multi-tenant identifier service 112 can perform operations to create and/or manage multi-tenant identifiers within the multi-tenant environment 110. For example, the multi-tenant identifier service 112 can receive a source system identifier from source system 120 (e.g., receive an attribute from source system 120 that is an identifier with a name and value, such as "primary key: 56789"). The multi-tenant identifier service 112 can determine if a multi-tenant identifier representing the received source system identifier already exists within the multi-tenant environment 110 by checking in the multi-tenant identifier database 116 (e.g., checking for a multi-tenant identifier by looking for an entry with the name and value of "primary key: 56789" and an identity provider of the source system 120). If a multi-tenant identifier already exists in the multi-tenant identifier database 116, then it can be used (e.g., a multi-tenant identifier of "1009" could be obtained and used to reference a data item associated with the received source system identifier). Using this procedure, incoming source system identifiers from source systems 120 and 130 can be replaced with multi-tenant identifiers that are unique within the multi-tenant environment 110.

An identity provider (idp) is a service that provides unique identifiers, identity, and/or login information for a system. A specific source system could handle its own unique identifiers, and thus would be its own identity provider (e.g., a one-to-one relationship between source system and identity provider). For example, a database source system could manage its own user accounts. A source system could also use an outside (e.g., external) identity provider. For example, a source system (e.g., a database or SharePoint system) could use a particular Active Directory service (e.g., managed by the same business or organization that manages the database or SharePoint system) as its identity provider. Multiple source systems could use the same identity provider. For example, a business could operate a SharePoint system and an Office 365® system, and both could use the same Active Directory identity provider.

In some implementations, the source system identifiers are received by the multi-tenant environment 110 along with data (e.g., external content items) and/or representations of data (e.g., metadata describing external content items). The source system identifiers and data can be stored in data storage systems (e.g., databases) of the source systems (e.g., data storage 125 of source system 120 and data storage 135 of source system 130).

The following example illustrates receiving metadata describing an external content item (a document in this example) from source system 120.

Example Metadata
  Primary key: 1234
  Created by: user1
  Title: This is my title
  ACL
  user1: view
  group1: view, update
  managers: view, update, approve When the example metadata is received at the multi-tenant environment 110, it is examined by the multi-tenant identifier service 112 and the source system identifiers are mapped to multi-tenant identifiers using the example mapping table (Table 2) below, which is stored in the multi-tenant identifier database 116.

TABLE 2

Example Mapping Table for Multi-Tenant Environment

| Multi-tenant identifier | Source identity provider | Name | Value |
| --- | --- | --- | --- |
| 1001 | Source1-idp1 | Primary Key | 12345 |
| 1002 | Source1-idp1 | principal-user | user1 |
| 1003 | Source1-idp1 | principal-group | group1 |
| 1004 | Source1-idp1 | principal-group | managers |
| 1005 | Source2-idp2 | Primary Key | 12345 |
| 1006 | Source2-idp2 | principal-user | user55990 |
| 1007 | Source3-idp1 | Primary Key | 56789 |
| 1008 | Source3-idp1 | principal-user | user23 |

In some implementations, looking up entries in the mapping table uses a system configuration from a system configuration database 114. The system configuration can specify how the data received from a given source system will be interpreted. For example, a specific configuration from the system configuration database 114 for source system 120 can specify that incoming "Created by" source system identifiers are looked up as "primary-user" in the mapping table.

Using Table 2, the primary key in the example metadata would be mapped to multi-tenant identifier 1001. The "Created-by: user1" identifier in the example metadata would be mapped to multi-tenant identifier 1002. The "user1: view" ACL in the example metadata would be mapped to multi-tenant identifier 1002. The "group1: view, update" ACL in the example metadata would be mapped to multi-tenant identifier 1003. The "managers: view, update, approve" ACL in the example metadata would be mapped to multi-tenant identifier 1004.

In some examples, a content object is generated at the multi-tenant environment 110 using the mapped multi-tenant identifiers. Using the above example metadata and mapping from Table 2, the following content object can be generated.

Example Content Object
   Content Object ID: 1001 (mapped using Table 2 from the primary key in the metadata)
   extID: 1234 (the unique identifier at the source system can be stored)
   created By: user1 (the unique identifier at the source system can be stored)
   createdByID: 1002 (mapped from Table 2)
   title: This is my title (the title from the metadata can be stored)
   ACL
   1002: view (mapped from Table 2)
   1003: view, update (mapped from Table 2)
   1004: view, update, approve (mapped from Table 2)

As depicted in Table 2, there is another entry for a source system identifier of "Primary Key" with a value of 12345. However, because this entry also includes the source identity provider, it will not result in a conflict with other entry for "Primary Key" with a value of 12345. Specifically, one of the entries is associated with the source identity provider "Source1-idp1" and the other entry is associated with the source identity provider "Source2-idp2," and therefore they would be mapped to different multi-tenant identifiers (1001 versus 1005 using Table 2). For example, two different documents could be received from source system 120 and 130 that both use the same primary key value of 12345, but they would be uniquely identified within the multi-tenant environment 110 because they would be mapped to different multi-tenant identifiers.

Figure 2:
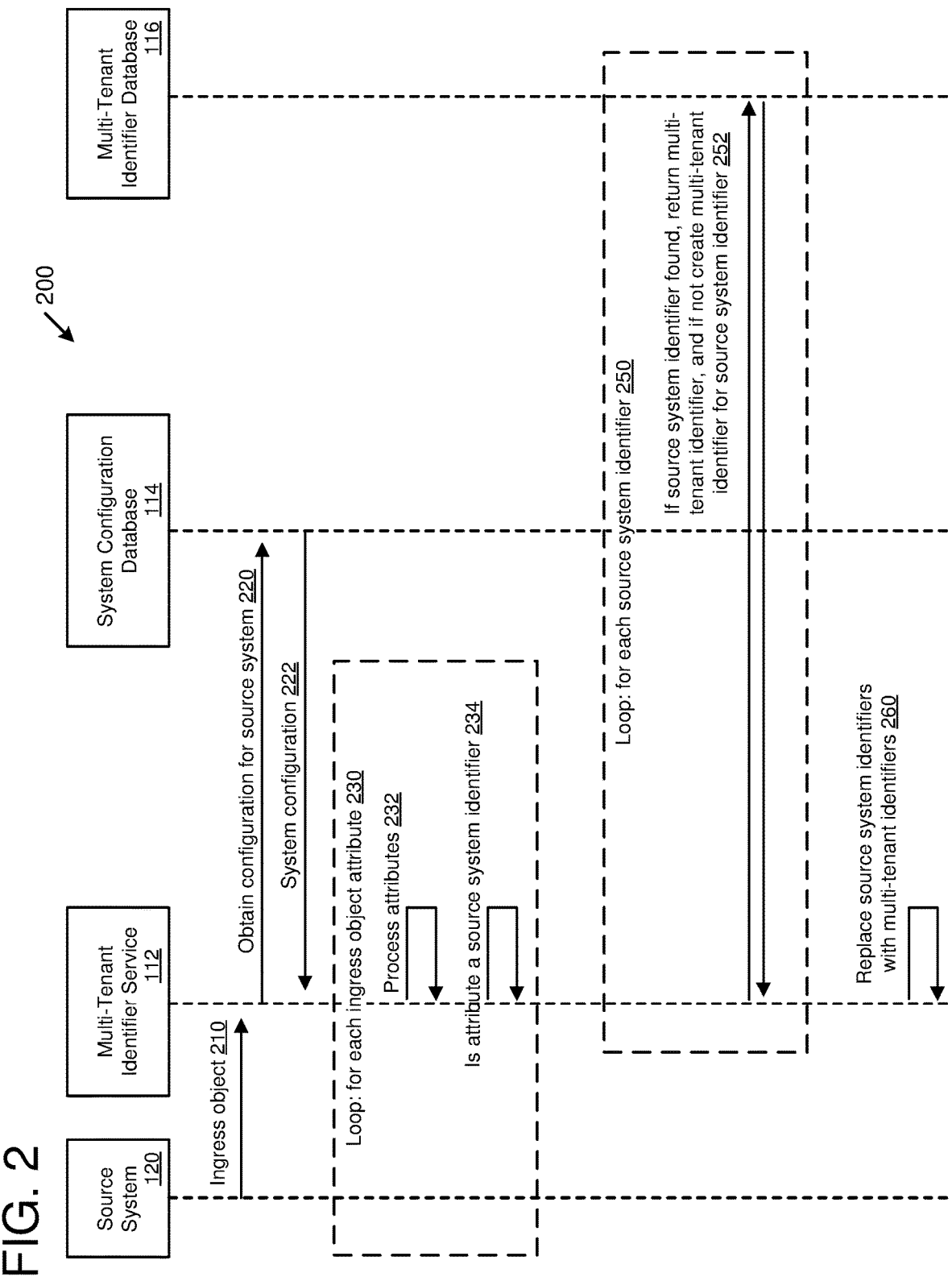
FIG. 2 is a diagram depicting an example information flow for obtaining multi-tenant identifiers for source system identifiers.

FIG. 2 is a diagram depicting an example information flow 200 for obtaining multi-tenant identifiers for source system identifiers. In the example information flow 200, communication is depicted between some of the components depicted in FIG. 1. As depicted at 210, the multi-tenant identifier service 112 receives an ingress object from the source system 120. The ingress object can comprise source system identifiers and/or other information. For example, the ingress object can be metadata describing an external content item (e.g., the example metadata depicted above).

As depicted at 220 and 222, the multi-tenant identifier service 112 obtains a system configuration from the system configuration database 114 for the specific source system 120.

As depicted at 230, a loop is performed for each ingress object attribute. In the loop, attributes are processed (e.g., to a content object), as depicted at 232. For example, if the attribute is not a source system identifier that needs to be mapped, then it can be translated directly (e.g., a title for a document). In the loop, attributes that are source system identifiers are identified, as depicted at 234.

As depicted at 250, a loop is performed for each of the source system identifiers. In the loop, if a source system identifier is found in the multi-tenant identifier database 116 (e.g., by matching the source system identifier and source identity provider), then the associated multi-tenant identifier is returned, and otherwise a new multi-tenant identifier is created and returned, as depicted at 252.

As depicted at 260, the source system identifiers are replaced with the received multi-tenant identifiers. For example, multi-tenant identifiers can be used in a generated content object that represents the ingress object (with the source system identifiers replaced with the multi-tenant identifiers).

Methods for Managing Multi-Tenant Identifiers

In the technologies described herein, methods are provided managing multi-tenant identifiers.

Figure 3:
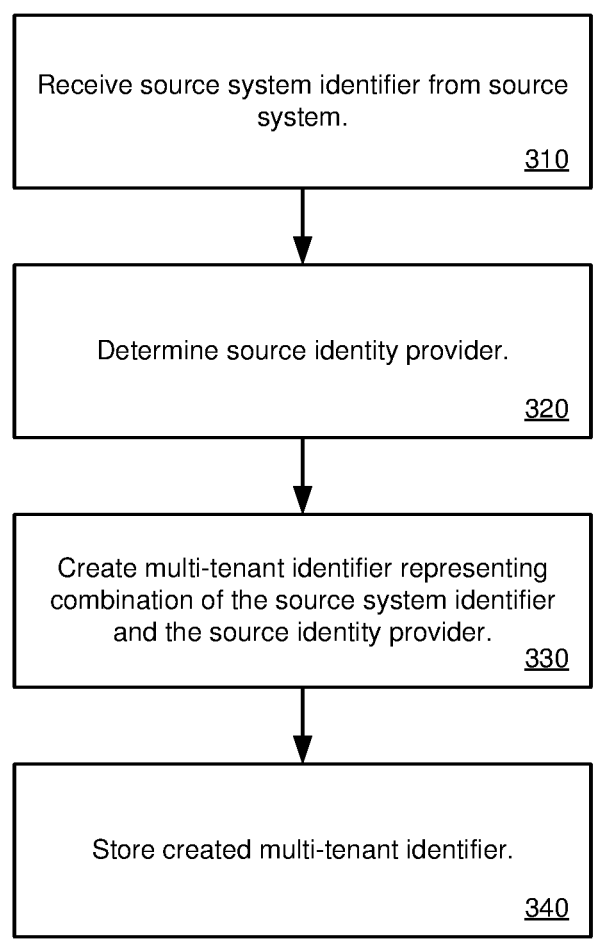
FIG. 3 is a diagram depicting an example flowchart for creating multi-tenant identifiers.

FIG. 3 is a flowchart showing an example method 300 for creating multi-tenant identifiers. The example method 300 can be performed, at least in part, by a multi-tenant identifier service (e.g., by multi-tenant identifier service 112).

At 310, a source system identifier is received from a source system. The source system identifier is a unique identifier used at the source system (e.g., a single-tenant identifier used at the source system). The source system identifier can comprise a name and a value.

At 320, a source identity provider of the source system is determined. For example, the source identity provider can be determined from information received form the source system (e.g., a unique customer or tenant identifier) and/or from system configuration information (e.g., a database of source systems and their associated identity providers).

At 330, a multi-tenant identifier is created representing a combination of the source system identifier and the source identity provider. The multi-tenant identifier is unique within the multi-tenant environment. The multi-tenant identifier can be created upon determining that the combination of the source system identifier and the source identity provider has not been seen before (e.g., it is not present in a multi-tenant identifier mapping table).

At 340, the multi-tenant identifier is stored in association with the combination of the source system identifier and the source identity provider in a data store of the multi-tenant environment. For example, the multi-tenant identifier can be stored in a multi-tenant identifier mapping table (e.g., in a multi-tenant identifier database).

Figure 4:
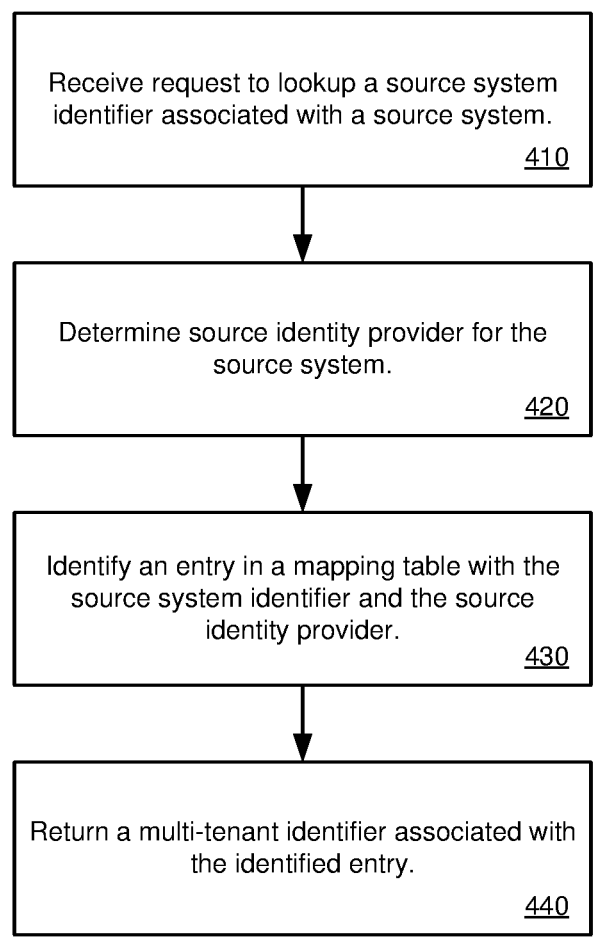
FIG. 4 is a diagram depicting an example flowchart for using multi-tenant identifiers.

FIG. 4 is a flowchart showing an example method 400 for using multi-tenant identifiers. The example method 400 can be performed, at least in part, by a multi-tenant identifier service (e.g., by multi-tenant identifier service 112).

At 410, a request is received to lookup a source system identifier associated with a source system. For example, the request can be received during processing of metadata describing an external content item received from an external system.

At 420, a source identity provider is determined for the source system. For example, the source identity provider can be determined from information received form the source system (e.g., a unique customer or tenant identifier) and/or from system configuration information (e.g., a database of source systems and their associated identity providers).

At 430, an entry is identified in a mapping table with the source system identifier and the source identity provider.

At 440, a multi-tenant identifier that is associated with the identified entry is returned. The multi-tenant identifier is unique within the multi-tenant environment. The multi-tenant identifier can be used to replace the source system identifier (e.g., in received metadata). For example, if the source system identifier is a primary key (name and value), then the primary key value can be replaced with the multi-tenant identifier for use within the multi-tenant environment.

External Systems and External Content

In the technologies described herein, metadata describing external content is obtained from external systems. An external system is a computing environment that is a source of external content, and that is separate from an internal computing environment (also called an internal environment or local environment). For example, an internal environment can be the computing environment of a specific organization, and can include computing resources such as server computers (e.g., database servers, search servers, content servers, web servers, etc.), networks and networking devices (e.g., routers, gateways, hubs, etc.), and user devices (e.g., desktop computers, laptops, tablets, phones, etc.). The internal environment can communicate with one or more external systems via a network (e.g., via the Internet). In some implementations, the external systems are operated by other organizations (different from the specific organization that operates the internal environment). For example, the external systems may be owned by different businesses from the one that owns the internal environment. In some other implementations, the external systems may be operated by the same organization as the internal environment.

An external system acts as a source of, and storage for, external content. One example of an external system is a document management system, such as the SharePoint® system provided by Microsoft®. Another example of a document management system is Google Docs™. As another example, an external system may be a specific source code management system. A given organization or business may operate one or more external systems. For example, a specific business may operate a SharePoint external system, a Google Docs external system, and a source code control external system. External content refers to any type of content (also called a document) that is accessible and usable within a computing environment, such as word processing documents spreadsheets, presentations, emails, blog posts, instant messages, multimedia files, digital pictures, audio files, video files, etc.

In some implementations, the internal environment provides computing services to organizations operating the external systems. For example, the internal environment may provide a service, such as a document collaboration and sharing service, to users of the organization operating the external systems. For example, a user of an external system could log in to the internal environment to work with various types of content (e.g., collaborate on document items, send instant messages or emails, perform searches, etc.). The user of the external system may want to work with the user's own content items that are located at the external system (called external content items because they are stored at the external system). Using the technologies described herein, the external content items at the external system can be utilized within the internal environment without having to store the external content items at the internal environment and while maintaining access restrictions.

Metadata

In the technologies described herein, metadata describing external content is obtained and managed. Metadata for an external content item can include information describing the external content item, information describing what type of actions can be performed for the external content item, permissions associated with the external content item, and/or other information associated with the external content item.

Metadata describing an external content item can include properties of the external content item. Examples of this type of metadata include title (e.g., title of a word processing document, email, blog post, etc.), author, creation date, update date, etc.

Metadata describing an external content item can include actions that can be performed for the external content item. For example, actions can include a like action (e.g., indicating that a user likes a particular external content item), a comment action (e.g., indicating that a particular user has commented on a particular external content item), and a share action (e.g., indicating that a particular user has shared a particular external content item with another particular user). Other actions can include a forward action, an approve action, an assign action, etc. Any type of action that can be performed in relation to the external content item can be represented in the metadata. For example, actions that can be performed for a source code control external system could include merge, update, approve, check-in, and check-out.

Metadata describing an external content item can include information that summarizes the external content item. For example, a thumbnail or snapshot can be created that represents an external content item (e.g., a thumbnail of a document or picture and/or a reference to a thumbnail). As another example, a brief description can be created for a text document. As another example, speech recognition metadata can be created from an audio file.

Metadata describing an external content item can include permission information. For example, information describing user and/or group permissions for the external content items can be included in the metadata. The permissions can reflect user and/or group permissions on the external systems and describe what the users and/or groups can do with the external content items on the external systems. For example, the permissions can include users (e.g., identified by unique user identifiers used by the external system) and/or groups (e.g., identified by unique group and/or user identifiers used by the external system) along with specific permissions. For example, the specific permissions can include read, write, update, etc. In some implementations, the permission information is obtained from access control lists (ACLs) provided by the external systems.

In some implementations, the metadata is obtained directly from the external systems. For example, an internal environment can send a request for metadata describing one or more external content items to an external system. In response, the internal environment can receive the metadata (e.g., a collection of metadata for each of a number of external content items maintained by the external system). The metadata can be obtained via a computer service running at the internal environment. The computer service can be called an ingress manager.

In some implementations, the metadata is obtained from the external content items but copies (e.g., replicated copies) of the external content items are not maintained at the internal environment. For example, the internal environment can temporarily retrieve (e.g., download) the external content items, determine metadata for the retrieved external content items or perform other processing (e.g., speech recognition, thumbnail creation, etc.), and then delete the retrieved external content items so that they are not stored at the internal environment. For example, the external content items can be cached on a temporary basis at the internal environment and then discarded once the processing is performed and the metadata is determined.

By not receiving, or not storing, the external content items themselves at the internal environment, a number of potential problems can be avoided. For example, if the external content items were to be replicated to the internal environment, then problems with data consistency can occur (e.g., the two copies can become out of sync).

The metadata can be obtained (e.g., directly from the external system and/or by retrieving the external content items) via a computer service running at the internal environment. The computer service can be called an ingress manager.

The actions included in the metadata can include actions that are performable at the internal environment (also called internal actions). For example metadata describing a text document content item can be retrieved from an external system and stored at the internal environment. The metadata can include actions that are performable within the internal environment such as like, comment, and share. For example, a user of the internal environment can comment on the specific text document, which can store information describing the comment (e.g., the user identifier for the user that made the comment, the content of the comment, the date and time of the comment, etc.) in a data store and associate the comment with the specific text document (e.g., with a reference to the metadata for the specific text object, such as a reference to a unique identifier of an object storing the metadata).

The actions included in the metadata can include actions that are performable at the external system (also called external actions). For example metadata describing a source code content item can be retrieved from an external system and stored at the internal environment. The metadata can include actions that a user of the internal environment can initiate but that are ultimately performed at the external system, such as approve, check-in, and merge. For example, a user of the internal environment can select the approve action for the source code content item. In order to carry out the approve action, the metadata can store the commands needed to perform the approve action in the external system (e.g., service call information that comprises specific instructions, such as a URL and parameters, that are specific to the source code content item, instructing the external system to approve the specific source code content item). The actions that are performable for a given external content item can include internal actions, external actions, or both internal and external actions.

In some implementations, the metadata for an external content item includes one or more of the following items: a unique identifier for the external content item in the internal environment, a unique identifier for the external content item in the external system, indications of the actions that are performable for the external content item, service call information for performing each of the actions, and one or more user permissions (e.g., ACLs) associated with the external content item.

Actions

In the technologies described herein, actions can be performed by users of the internal environment in relation to the external content items using the metadata. Actions can include internal actions that are performable within the internal environment and/or external actions that are initiated at the internal environment and that are ultimately carried out at the external system.

The actions that can be performed for a given external content item can be identified by the external system that stores or manages the external content item. For example, the internal environment can receive metadata from the external system that includes a list of the actions that can be performed (e.g., external actions that are performable by the external system). For example, a specific source code control external system could support approve, check-in, check-out, and merge actions.

The actions that can be performed for a given external content item can be identified at the internal environment. For example a component of the internal environment (e.g., an ingress manager or other software running at the internal environment) can obtain metadata describing an external content item. The component can determine actions that are performable for the external content item and add the actions to the metadata. The actions that are determined by the component can include internal actions that are performed within the internal environment and/or external actions that are initiated within the internal environment but performed at the external system.

Actions can be performed by a user of the internal environment. For example, the user can access metadata describing a specific external content item (e.g., view a representation of the metadata in a graphical user interface). Actions that can be performed by the user can also be presented (e.g., graphical icons representing the actions). The user can select a specific action to perform (e.g., select one of the icons). Selecting a specific action can perform the action by accessing the metadata for that action. For example, if the action is an internal action, then the metadata for the action could contain service call information comprising a URL to an internal service for performing the action (e.g., for a like action, a URL to an internal service along with unique identifiers for the metadata object and the user performing the action). If the action is an external action, then the metadata for the action could contain service call information comprising transformation logic for creating an external service call that references the external content item and the specific action to perform.

Actions can also be performed by other entities (other than users) of the internal environment, such as by automated systems. For example, an automated chat bot could execute an external action (such as "close issue") based on a combination of inputs from different users in a group collaboration session (e.g., everyone in the conversation agrees that the issue should be closed, which initiates the automated chat bot to perform the action). Another action could be based on the correlation of data received from different systems (e.g., a bug tracking system indicates that the status of a bug is "resolved" and the external facing status system still shows the bug as "active," so the bug tracking system initiates an external action to change the status of the bug to "resolved" in external facing status system In some implementations, the service call information (e.g., for an internal action and/or an external action) comprises a description of the service endpoint for carrying out the action in addition to transformation logic. The service endpoint can be, for example, a URL or other reference to the service that will carry out the action (e.g., a URL located within the internal environment or an external URL associated with the external system). The transformation logic includes instruction for mapping information from the metadata and generating the service call (e.g., which parameters are needed for the service call, mapping information for creating the parameters from the metadata, permission and access requirements, etc.). For example, the transformation logic can be used to create parameters for an application programming interface (API) call for performing the action.

The service call information can be received from the external system (e.g., via a connector). For example, the external system can provide service call information for a number of external actions that are supported by the external system. The service call information can also be created within the internal environment (e.g., by the ingress manager). In some implementations, an owner or other third party associated with the external system creates an external system specific connector including the service call information for a number of actions supported by the external system. In this way, the owner of the external system can define the actions that are supported and how they are performed without programmers of the internal environment having to create the service call information. For example, the internal environment can just receive the metadata describing the actions and associated service call information (e.g., for external actions) without operators of the internal environment having to create the service call information for the external actions of the external system. This also allows the environment to be extensible (e.g., the owners of the external systems can create their own connectors to provide metadata, including descriptions of actions and service call information, to the internal environment in a common format).

The following is an example of service call information for a specific action, which is an action to approve with a comment. The example metadata below contains the transformation logic for the "approve with a comment" action.

```
"actionMappings":[
{
    "name":"approve",
    "permission":"approve",
    "verb":"post",
    "url":"approve",
    "body":"{\"id\":\"%extId%\",\"action\":\"APPROVE\",\"comment\":\"%html.comment%\"}",
    "buttonLabel":"Approve"
}
```

Using the above example metadata for the "approve with a comment" action, the below example service call can be generated and performed.

```
HTTP POST: https://mydomain.com/approve
    BODY: {"id":"DOC-1234567","action":"APPROVE":"comment":"comment from HTML form"}
```

In the above service call example, the "POST" is the "verb" in the action mapping metadata, the domain (mydomain.com) is obtained from a connector configuration file for the specific external system, and the "/approve" in the URL is the "url" from the action mapping metadata. The "body" in the action mapping metadata is used to create the "BODY" of the service call in which % extId % is the external identifier of the external content item and is obtained from the metadata for the external content item. The % html.comment % is obtained from the web page that is used to collect the comment from the user. While this example uses HTML to collect the comment from the user, any client technology may be used.

The following is another example of service call information for a specific action, which is a view action. The example metadata below contains the transformation logic for the view action.

```
"actionMappings":[
{
    "name":"retrieve",
    "permission":"read",
    "verb":"get",
    "parms":"id=\"%extId%\"",
    "buttonLabel":"View"
}
```

Using the above example metadata for the view action, the below example service call can be generated and performed, which will allow the user to view the actual external content item in the user's web browser.

HTTP GET: https://mydomain.com/retrieve?id=DOC-1234567

Permissions

In the technologies described herein, permissions can be obtained and/or generated for external content items. Permissions can be obtained from the external system (e.g., in the format of ACLs) and used to map users and/or groups of the external system to internal user and/or group identifiers. In this way, permissions of the external system can also be enforced within the internal environment.

In some implementations, the external system provides metadata containing user permissions indicating which actions can be performed by which users and/or groups. For example, the user permissions can include a list of users and which action or actions each user can perform (e.g., user1 can perform an update action, user2 can perform update and merge actions, and so on). The user permissions can also include a list of groups and which action or actions each group can perform (e.g., group1 can perform update and merge actions).

Content Objects

In the technologies described herein, metadata can be stored in a content object (also called a generic content object). The content object can store the metadata in a variety of formats, such as a text format, a database record, an XML format, or another data storage format.

The content object can store one or more unique identifiers (e.g., a primary key in a database or another type of unique identifier). The unique identifiers can include a unique identifier for an external content item, which is the unique identifier that the external system uses to reference the external content item. For example, an external system can store content items that are identified by unique identifiers, and the unique identifiers can be provided to the internal environment as part of the metadata. As a specific example, an external system can provide a primary key with a value of 12345 as the unique identifier for a specific external content item.

The unique identifiers can include a unique identifier for an external content item in an internal environment, which is the unique identifier that the internal environment uses to reference the external content item. For example, when the internal environment receives metadata for a new external content item, a unique identifier can be generated to reference the external content item within the internal environment. As a specific example, the internal environment could generate a unique identifier of 1002 to reference the external content item and store that in the content object for the external content item.

The content object can store indications of the actions that are performable for an external content item. The actions can be stored along with service call information for performing the actions. As a specific example, the actions can comprise a list of action name and service call information (in this example, a simplified URL), such as:

view, www.domain1.com/view
approve, www.domain1/approve
merge, www.domain1/merge The content object can store user permissions (e.g., ACLs) for an external content item. The user permissions can indicate specific users and/or groups and the actions that can be performed by the specific users and/or groups. As a specific example, the list below contains three unique user or group identifiers and the actions that can be performed.

1002: view
1003: view, update
1004: view, update, approve

Example Environments for Managing Metadata

In the technologies described herein, metadata can be obtained and managed by an internal environment. For example, computing resources of the internal environment can obtain metadata associated with external content items stored at external systems. The metadata can be stored at the internal environment (without storing the external content items at the internal environment). The metadata can be used within the internal environment (e.g., users can perform actions in relation to the external content items using the metadata, such as search and collaboration actions).

Figure 5:
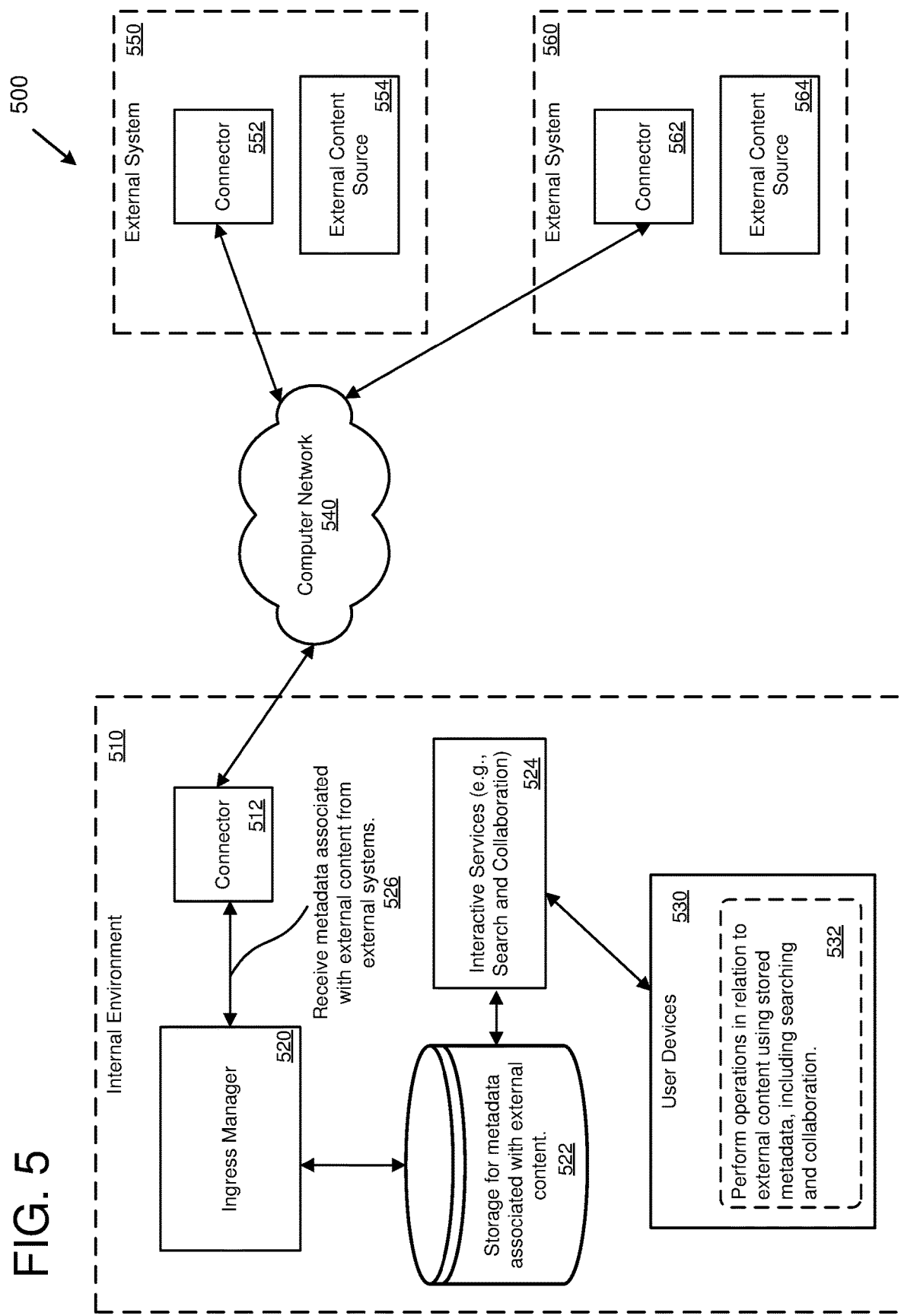
FIG. 5 is a diagram depicting an example environment where metadata is obtained and managed.

FIG. 5 is a diagram depicting an example environment 500 where metadata is obtained and managed. The example environment 500 includes an internal environment 510 (also called a local environment). The internal environment 510 is operated by a collection of computing resources, such as server computers (e.g., database servers, search servers, content servers, web servers, etc.), networks and networking devices (e.g., routers, gateways, hubs, etc.), and user devices (e.g., desktop computers, laptops, tablets, phones, etc.). The internal environment 510 can be the computing environment of a particular business or organization.

The internal environment 510 is connected to external systems 550 and 560 via a computer network 540. For example, the computer network 540 can comprise local area networks, wide area networks, the Internet, and/or other computer networks. The external systems 550 and 560 are external and operated separately from the internal environment 510. In some implementations, the external systems 550 and 560 are operated by different businesses or organizations from the particular business or organization that operates the internal environment 510. The external systems 550 and 560 can be located remotely from the internal environment 510 (e.g., located in a different geographical location, such as a different state or country). While two external systems are depicted, an environment may have one or more external systems, and a given business or organization may operate one or more external systems.

The external systems 550 and 560 are a source of external content items. For example, external system 550 contains external content source 554 (e.g., a data store, such as a database, storing external content items). External system 560 contains external content source 564. For example, external system 550 could be a SharePoint system and external system 560 could be a Google Docs system.

As depicted at 526, the internal environment 510 receives metadata associated with external content from the external systems (e.g., external systems 550 and 560). In some implementations, metadata is obtained, at least in part, using a connector. The connector represents software that performs functions for receiving (or retrieving) metadata associated with an external system and can be implemented as a separate software component and/or integrated into other software systems. The connector may be located at the internal environment, as depicted by connector 512, and/or at the external system, as depicted by connectors 550 and 560.

In some implementations, the connector is an external system specific connector. For example, a specific connector can be created for providing metadata for a specific external system. The specific connector can be programmed to extract the metadata from the specific external system and transform it into a common format for receiving and processing by the internal environment 510 (e.g., by the ingress manager 520). For example, the specific connector can comprise software that knows how to obtain metadata for the specific external system, such as obtaining content item properties, actions, user permissions, etc. An external system specific connector can be created by an entity (e.g., a business or organization) that operates the external system. In some implementations, the internal environment 510 contains a number of external system specific connectors, each specific to a corresponding external system.

In some implementations, metadata is obtained without using a connector. For example, other software and/or hardware components of the internal environment can receive metadata from the external systems.

The internal environment 510 includes an ingress manager 520. The ingress manager 520 can be implemented as a separate software component of the internal environment 510 and/or integrated with other software services of the internal environment 510. The ingress manager 520 receives the metadata from the external systems (e.g., via connector 512). The ingress manager 520 can also generate additional metadata. For example, the ingress manager 520 can determine actions that can be performed for the external content items and add indications of the actions to the metadata. The ingress manager 520 can also determine user permissions (e.g., generate user permissions from ACLs received from the external systems). The ingress manager 520 can also add other types of metadata and/or modify the metadata received from the external systems. The ingress manager 520 (or another component of the internal environment 510) can also create and manage multi-tenant identifiers. For example, source system identifiers used at the external systems (e.g., external systems 550 and 560) and present in the metadata (including user and group permissions) can be mapped to multi-tenant identifiers that are unique within the internal environment 510.

Once metadata has been generated for a particular external content item, it is stored in a data store 522 (e.g., a database or another type of data store). For example, the data store 522 can store the metadata as content objects (e.g., with one content object storing metadata for one external content item).

The stored metadata is used by users of the internal environment 510 to perform operations with regard to the external content items. For example, users of user devices 530 perform operations in relation to the external content items using the stored metadata (e.g., stored in the data store 522) via interactive services 524 provided by the internal environment 510. For example, a user could use a search service to find external content items and perform actions (e.g., liking, commenting, sharing, etc.) in relation to the external content items.

Figure 6:
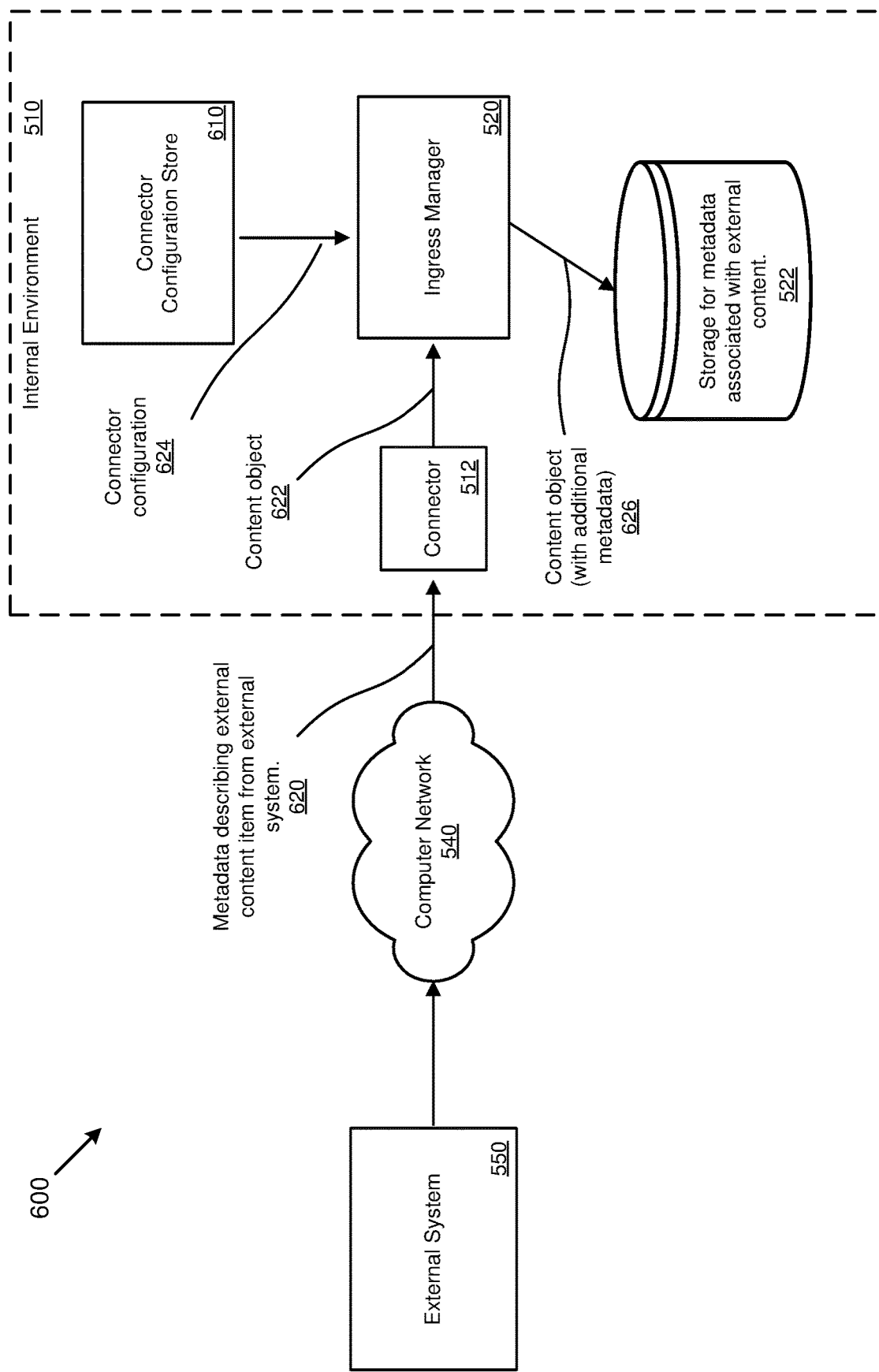
FIG. 6 is a diagram depicting an example environment in which metadata describing external content items is received and processed.

FIG. 6 is a diagram depicting an example environment 600 in which metadata describing external content items is received and processed. The example environment 600 illustrates example procedures for receiving (or retrieving) metadata describing external content items in relation to some of the components described with regard to FIG. 5.

As depicted at 620, metadata describing an external content item is received at the internal environment 510 from the external system 550. The following is a simplified example of received metadata describing an example external content item that is a blog document (stored at the external system 550) created by a user with a unique user identifier of user1 and with a title of "This is my title."

Primary key: DOC-1234567

Created by: user1

Title: This is my title objectType: blog

ACLs

99: read, write group8: read, publish

In this example implementation, the metadata describing the external content item is received by connector 512. The connector 512 transforms the received metadata into an internal format. For example, the connector 512 can map attributes and values in the received metadata to internal attributes and values (e.g., to a common internal format that is common across a number of external systems). The connector 512 can output the transformed metadata in the format of a content object, as depicted at 622. The following is an example of transformed metadata that could be output by the connector 512.

```
{"version":"1.0", "extId":"1234567", "metadata":[
    {"name":"sourceSystemObjectId", "type":"extId", "value":"DOC-1234567" },
    {"name":"principal", "type":"extId", "value":"99", "details":[
        { "name":"acl", "type":"permission", "values":[
            "read", "write" ] } ] },
    { "name":"principal", "type":"extId", "value":"group8", "details":[
        { "name":"acl", "type":"permission", "values":[
            "read", "publish" ] } ] },
    { "name":"externalObjectLinks", "type":"attribute", "value":"rawDocument",
"details":[
        { "name":"rawDocument", "type":"uri",
"value":"https://mydomain.com/myfile.doc" },
        { "name":"hash", "type":"md5hash", "value":"somelonghashvalue" } ] },
    { "name":"sourceMd5Hash", "type":"md5hash", "value":"someLongHashValue" },
    { "name":"changeMd5Hash", "type":"md5hash", "value":"someLongHashValue" },
    { "name":"relationships", "type":"extId", "value":"this", "details":[
        { "name":"parent", "type":"extId", "value":"parentDocId" } ] },
    { "name":"rawObject", "type":"base64", "value":"base64string" } ]
}
```

The output of the connector 512 is provided to the ingress manager 520. The ingress manager 520 can perform additional transformations and/or determine additional metadata (e.g., specific to the internal environment 510). In some implementations, the ingress manager 520 uses a connector configuration 624 from a connector configuration store 610. For example, the connector configuration 624 can describe the structure, format, and meaning of the incoming metadata including processing of metadata that is specific to an external system. The following is an example of the connector configuration 624.

```
{ "version":"1.0",
    "attrMappings":[ { "sourceName":"status", "type":"flexfield", "size":0,
"JCOAttribute":"flex1" },
        { "sourceName":"project", "type":"flexfield", "size":0, "JCOAttribute":"flex2" },
        { "sourceName":"labels", "type":"flexfield", "size":0, "JCOAttribute":"flex3" } ],
    "displayMappings":[ { "name":"preview",
"mapping":"\"<title>%title%</title><p><p>Project: %project%<p>Type: %type%<p>Labels:
%labels%<p><p><p>%body%\"" } ],
    "actionMappings":[ { "name":"approve", "permission":"approve", "verb":"post",
"url":"approve", "body":"{\"id\":\"%extId%\",\"action\":\"APPROVE\"}",
"buttonLabel":"Approve" },
        { "name":"retrieve", "permission":"read", "verb":"get",
"parms":"id=\"%extId%\"", "buttonLabel":"Retrieve" } ],
    "externalSystem":{ "id":"12345", "rootUrl":"https://mydomain.com",
```

-continued

```
"auth":{ "apiKey":"Somekeyvalue", "apiSecret":"SomeSecret",
"cert":"certOrPathToCert" } }, "healthcheck":{ "url":"https://mydomain.com/health",
"parms":"parmlabel=%parmvalue%&parmLabel2=%parmValue2", "expectStatus":200,
"expectText":"OK", "frequency":10, "retries":3 },
    "connectorConfig":[ { "key":"keyValue", "value":"value" } ]
}
```

The ingress manager 520 outputs the completed metadata (e.g., in the format of a content object) describing the external content item and stores it in the content store 522, as depicted at 626. The following is an example of the completed metadata that could be output by the ingress manager 520 and stored in the data store 522.

```
{
    "version":"1.0", "GCOId":"1001", "tenantId":"d69859d5-00c7-4d9e-b873-
d2050ad3436e",
     "region":"1", "sourceSystemId":"1234", "sourceSystemObjectId":"DOC-1234567",
     "sourceSystemIdentityId":"1002", "sourceSystemType":"SharePoint2017",
     "externalObjectLinks":[ { "objectType":"rawObject", "locationType":"url",
"location":"https://mydomain.com/myfile.doc",
          "md5Hash":"c94b8052489960a182f2440f642ffe42"
}],
     "internalObjectLinks":[ { "objectType":"rawObject", "locationType":"url",
          "location":"https://s3.amazonaws.com/d69859d5-00c7-4d9e-b873-
d2050ad3436e/myfile.doc", "md5Hash":"c94b8052489960a182f2440f642ffe42" },
       { "objectType":"extractedText", "locationType":"url",
"location":"https://s3.amazonaws.com/debtest-
abcd/Public+Jive+AWS+Security+White+Paper+v2.txt",
          "md5Hash":"c94b8052489960a18adda40f642ffe42" } ],
     "acl":[ { "principal":"1003", "permissions":[ "read", "write" ] },
          { "principal":"1004", "permissions":[ "read", "publish" ] } ],
     "actions":[ { "name":"approve", "permission":"approve", "verb":"post", "url":"approve",
"body":"{\"id\":\"%extId%\",\"action\":\"APPROVE\"}", "buttonLabel":"Approve" },
       { "name":"retrieve", "permission":"read", "verb":"get",
"parms":"id=\"%extId%\"", "buttonLabel":"Retrieve" } ],
"sourceMd5Hash":"someLongHashvalue", "changeMd5Hash":"someLongHashvalue",
     "relationships":[ { "type":"parent", "sourceRelationId":"parentDocId" } ]
     "usage":[ { "system":"GCO", "states":[ { "state":"CREATE", "timestamp":"2017-02-
14T18:16:10.674+0000" } ] } ],
     "attributes":{ "key1":"value1", "key2":"value2", "key3":"value3" }
}
```

Figure 7:
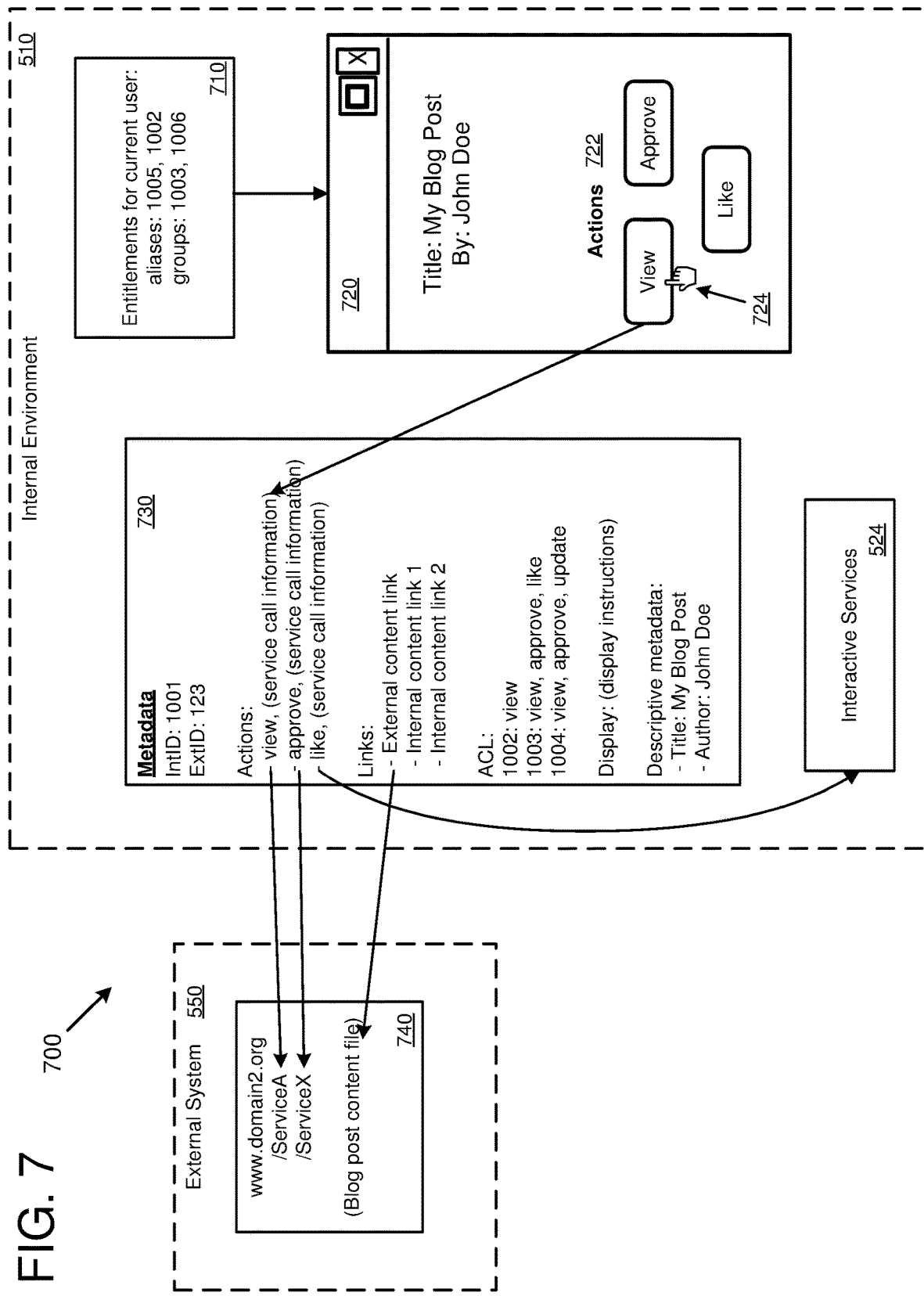
FIG. 7 is a diagram depicting an example of displaying an external content item and initiating performance of actions using metadata.

FIG. 7 is a diagram depicting an example 700 of displaying an external content item and initiating performance of actions using metadata. In the example 700, the internal environment 510 is depicted along with a displayed web page 720. The web page 720 displays a specific external content item, which is a blog post with a title of "My Blog Post" that was written by the user John Doe. Because the external content item itself is not stored within the internal environment 510, the external content item is displayed using information from the metadata, which in this example includes the title and author. The way in which the external content item is displayed (e.g., the formatting and information layout) can be defined by display instructions (e.g., HTML or another display language) contained within the metadata). The web page 720 is being viewed by a user of the internal environment 510 (e.g., on the user's desktop, laptop, phone, or other computing device in communication with a web server associated with the internal environment 510). For example, the web page 720 can be displayed as a result of the user searching for documents that were written by John Doe or searching for blog posts in general and selecting the specific blog post by John Doe.

The web page 720 also includes a number of actions 722 that are performable for the external content item (the specific blog post in this example). This actions that are performable in this example are a view action, an approve action, and a like action. The specific actions 722 that are displayed for the specific external content item can be selected based on permissions. For example, the specific user that is accessing the external content item can be required to have permissions (e.g., specific user permissions and/or group permissions) to perform the actions, and only the actions that the user has permission to perform (e.g., a subset of the actions that are available for the external content item in the metadata) can be displayed or otherwise made available to the user. In some implementations, a list of entitlements 710 for the current user is used to determine user permissions and which actions the user will have access to. The entitlements can include a list of user identifiers (also called aliases) for the user in the internal environment 510 as well as various external systems (e.g., the specific user can be associated with a number of unique user identifiers, some of which map to user identifiers at external systems). The entitlements can also include a list of group identifiers for groups to which the user belongs, which can also map to external groups. In the specific example list of entitlements 710, the specific user is associated with unique user identifiers of 1005 and 1002 and with unique group identifiers 1003 and 1006. For example, the unique user identifier 1002 could represent the user's account at the internal environment 510 while the unique user identifier 1005 could map to a unique user identifier at a specific external system (e.g., the specific user may have an account with a unique identifier of joe5525 at the external system 550). In this example, the specific user can be determined to have permissions to access the view, approve, and like actions based on the user identifier of 1002 (giving access to the view action via the ACLs of the metadata 730) and the group identifier of 1003 (giving access to the view, approve, and like actions via the ACLs of the metadata 730).

Example metadata 730 for the currently selected external content item is also displayed. The example metadata 730 includes unique identifiers, links, actions, access control lists, display instructions, and other descriptive metadata. The actions include service call information for performing the action (e.g., internal and/or external actions).

In the example 700, the user has selected the view action (e.g., tapped or clicked on a graphical button or icon representing the view action), as depicted at 724. As a result, the internal environment has accessed the metadata 730 and generated a service call for the view action using the service call information in the metadata 730. The service call for the view action in this example is to a service running in the external system 550 (in this example, the /ServiceA service at the www.domain2.org domain, as depicted at 740). The service call can include, for example, a URL, parameters, access credentials, and/or other service call information for carrying out the view action for the external content item. A second action is also included in the metadata 730, which is the approve action. The approve action, if selected, would generate a service call to a different service of the external system, as depicted at 740. A third action is also included in the metadata 730, which is the like action. The like action, if selected, would generate a service call to an internal service (depicted in this example by the interactive services 524) of the internal environment 510. In general, actions for the selected external content item can generate service calls to services running at the same external system, to services running at other external systems, and/or to services running within the internal environment 510.

As a result of selecting the view action, as depicted at 724, the internal environment 510 can send the service call to the external system 550, which can result in the blog post content being displayed to the user in the web browser (e.g., in a web page frame of the currently displayed web page 720 or in a new web page). Other actions can produce a different result. For example, if the user selects the approve action, then the service call can be sent to the external system 550 to perform the action and a result of the action can be returned (e.g., a message displayed to the user in the web browser indicating that the approve action was successfully performed by the external system 550).

The metadata 730 also includes a number of links. The links (which may or may not be present in the metadata for a given external content item) include one or more external content links and/or one or more internal content links. An external content link is a link to the external content item located on the external system. For example, an external content link may be used if the internal environment 510 needs to access the external content item itself (e.g., to retrieve a video file for creating a video clip or thumbnail, or to retrieve an audio file for performing speech recognition). In the example metadata 730, there is one external content link the blog post file located on the external system 550.

An internal content link is a link to internal content derived from the external content item. For example, if the external content item is an audio file then speech recognition can be performed and the resulting text file stored at the internal environment 510 and referenced by an internal content link in the metadata.

In some implementations, the unique identifiers depicted in FIG. 7 are multi-tenant identifiers that are created within the internal environment 510 to replace source system identifiers provided by the external system 550. The unique identifiers are depicted in the example metadata 730 (e.g., 1001, 1002, 1003, and 1004 can be multi-tenant identifiers) and in the list of entitlements 710 (e.g., 1002, 1003, 1005, and 1006 can be multi-tenant identifiers).

Methods for Managing Metadata for External Content Items

In the technologies described herein, methods are provided for managing metadata for external content items. For example, metadata can be received from external systems describing external content items. The metadata can be received and processed by an internal environment and used for interacting with the external content items, without the external content items having to be stored at the internal environment.

Figure 8:
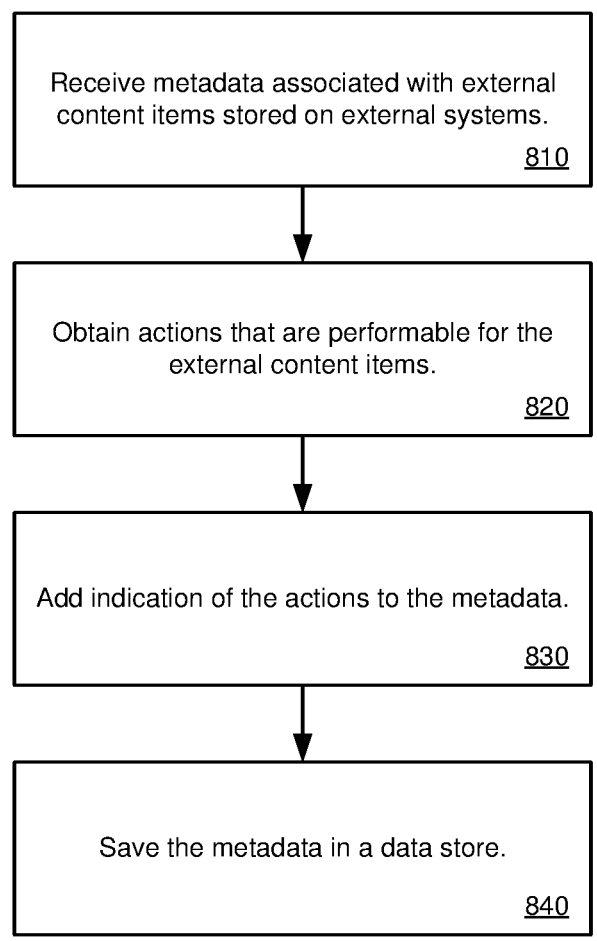
FIG. 8 is a diagram depicting an example flowchart for managing metadata associated with external content items.

FIG. 8 is a flowchart showing an example method 800 for managing metadata associated with external content items. The example method 800 can be performed, at least in part, by an internal environment (e.g., by internal environment 510). For example, the example method 800 can be performed, at least in part, by one or more connectors (e.g., connector 512, 552, and/or 562) and/or an ingress manager (e.g., ingress manager 520).

At 810, metadata associated with external content items is received by an internal environment from an external system. In some implementations, the external content items themselves are not received (i.e., the internal environment does not receive the external content items, just the metadata describing the external content items). In some implementations, the internal environment receives the external content items themselves in order to extract metadata and/or perform some other processing on the external content items, but then deletes the external content items so that they are not stored at the internal environment (e.g., the external content items are received temporarily and then discarded). In some implementations, metadata is received from the external system for some of the external content items while for other external content items the external content items themselves are temporarily received from which metadata is determined.

At 820, actions that are performable for the external content items are obtained. For example, the actions (e.g., external actions) can be received as part of the metadata from the external system. Actions can also be determined by the internal environment (e.g., internal actions and/or external actions).

At 830, an indication of the actions are added to the metadata. For example, service call information can be determined for the actions and added to the metadata. The service call information can be used when performing the actions. For example, a user of the internal environment can interact with the external content item (e.g., select a representation of the external content item from a message or search result), view available actions for the external content item, and initiate performance of one of the available actions. Initiating performance of the action can access the metadata for the action and generate a service call to perform the action using the service call information.

At 840, the metadata is saved in a data store. The metadata is usable at the internal environment to perform the actions in relation to the external content items.

Figure 9:
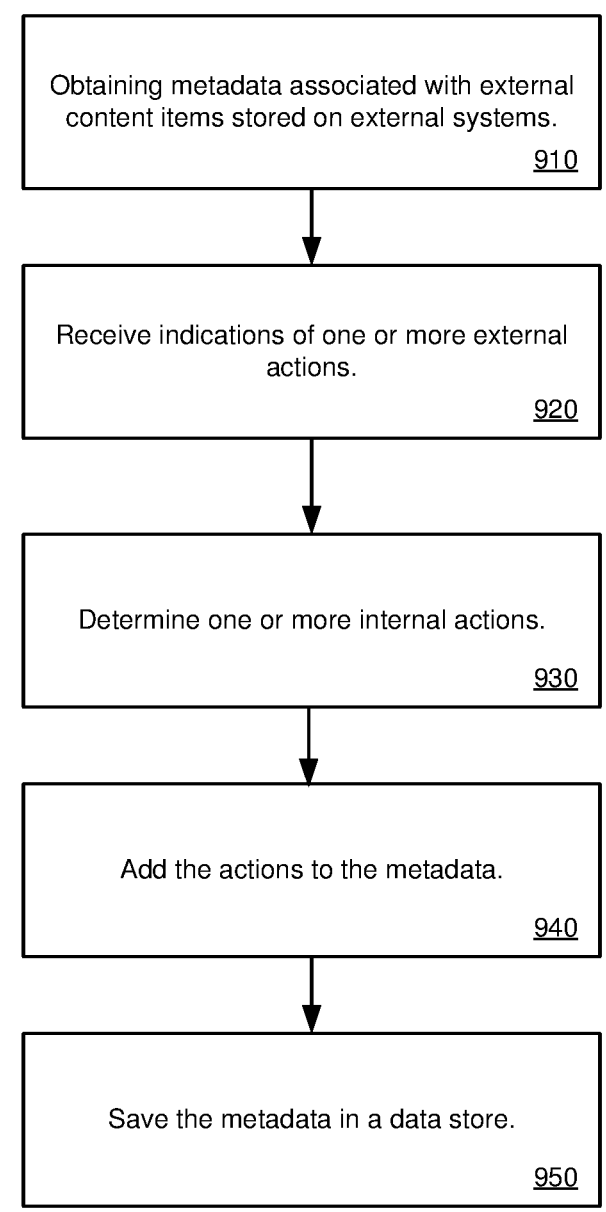
FIG. 9 is a diagram depicting an example flowchart for managing metadata associated with external content items, including determining internal and external actions.

FIG. 9 is a flowchart showing an example method 900 for managing metadata associated with external content items including determining internal and external actions. The example method 900 can be performed, at least in part, by an internal environment (e.g., by internal environment 510). For example, the example method 900 can be performed, at least in part, by one or more connectors (e.g., connector 512, 552, and/or 562) and/or an ingress manager (e.g., ingress manager 520).

At 910, metadata associated with external content items is obtained by an internal environment from an external system. In some implementations, the metadata is received from the external system without receiving the external content items themselves. In some implementations, the internal environment receives the external content items themselves in order to extract metadata and/or perform some other processing on the external content items, but then deletes the external content items so that they are not stored at the internal environment (e.g., the external content items are received temporarily and then discarded). In some implementations, metadata is received from the external system for some of the external content items while for other external content items the external content items themselves are temporarily received from which metadata is determined.

At 920, indications of external actions are received from the external system. The indications of the external actions are received in the metadata from the external system.

At 930, internal actions are determined by the internal environment. For example, the internal environment can determine internal actions that are performable within the internal environment based on the external content items and/or based on other factors. For example, the internal actions can be determined based on the external system, based on the owner or operator of the external system, based on a content type of an external content item, etc.

At 940, the internal and external actions are added to the metadata. For example, adding the actions to the metadata can include generating service call information for the actions and including the service call information in the metadata.

At 950, the metadata is saved in a data store. The metadata is usable at the internal environment to perform the actions in relation to the external content items.

Figure 10:
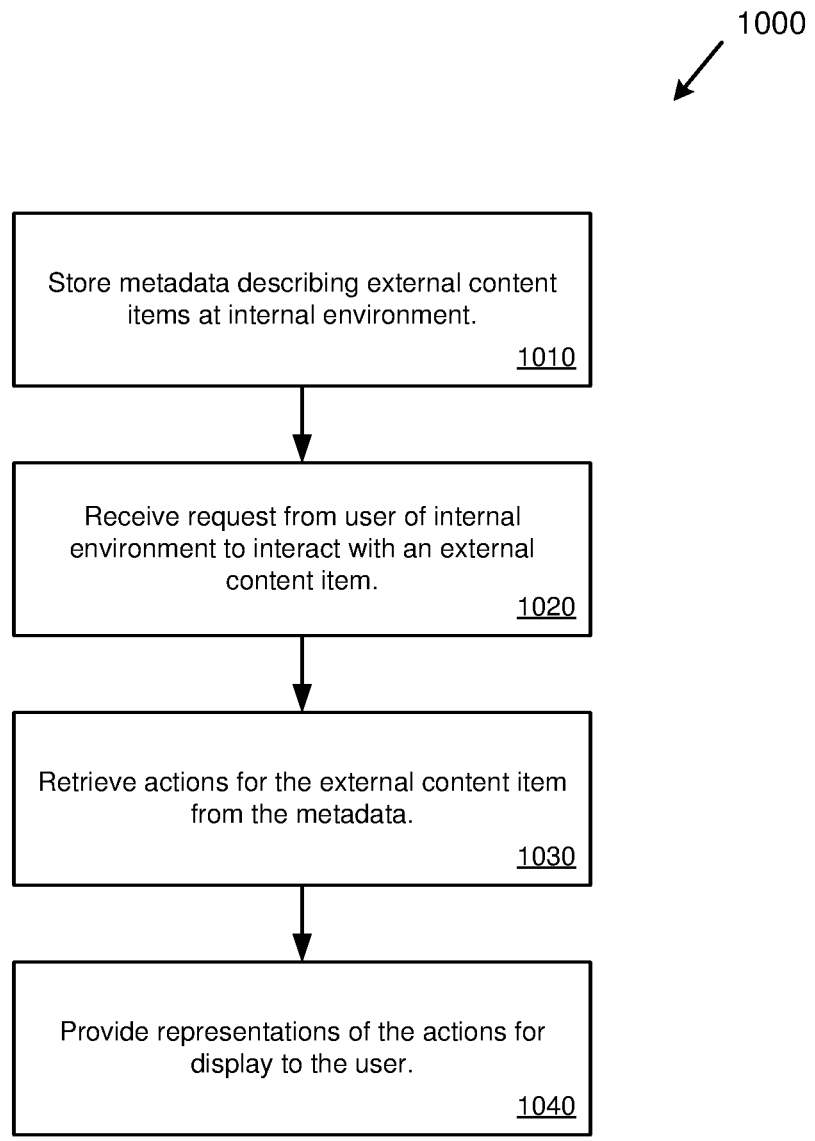
FIG. 10 is a diagram depicting an example flowchart for managing metadata associated with external content items, including displaying representations of actions.

FIG. 10 is a flowchart showing an example method 1000 for managing metadata associated with external content items including displaying representations of actions. The example method 1000 can be performed, at least in part, by an internal environment (e.g., by internal environment 510). For example, the example method 1000 can be performed, at least in part, by an ingress manager (e.g., ingress manager 520).

At 1010, metadata that describes external content items is stored at an internal environment. At least a portion of the metadata was received by the internal environment from an external system. Metadata can also be generated at the internal environment and stored. The external content items themselves are not stored at the internal environment.

At 1020, a request is received from a user of the internal environment to interact with an external content item. For example, the user can select the external content item from within a search or collaboration system (e.g., select a title or name of the external content item displayed in a search results web page).

At 1030, actions that are performable for the requested external content item are retrieved from the stored metadata. The actions can include internal actions and/or external actions. The retrieved actions can be all of the available actions for the external content item or the actions can be filtered (e.g., the actions can be limited based on the permissions of the user and/or groups that the user belongs to). For example, the metadata for the external content item can contain a list of ACLs listing the users and/or groups that are allowed to access the actions associated with the external content item.

At 1040, representations of the actions are provided for display to the user. For example, the representations can include graphical icons, text, audio, etc. For example, a list of actions (e.g., like, view, comment, etc.) can be displayed in a web page to the user for selection.

Example Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 11:
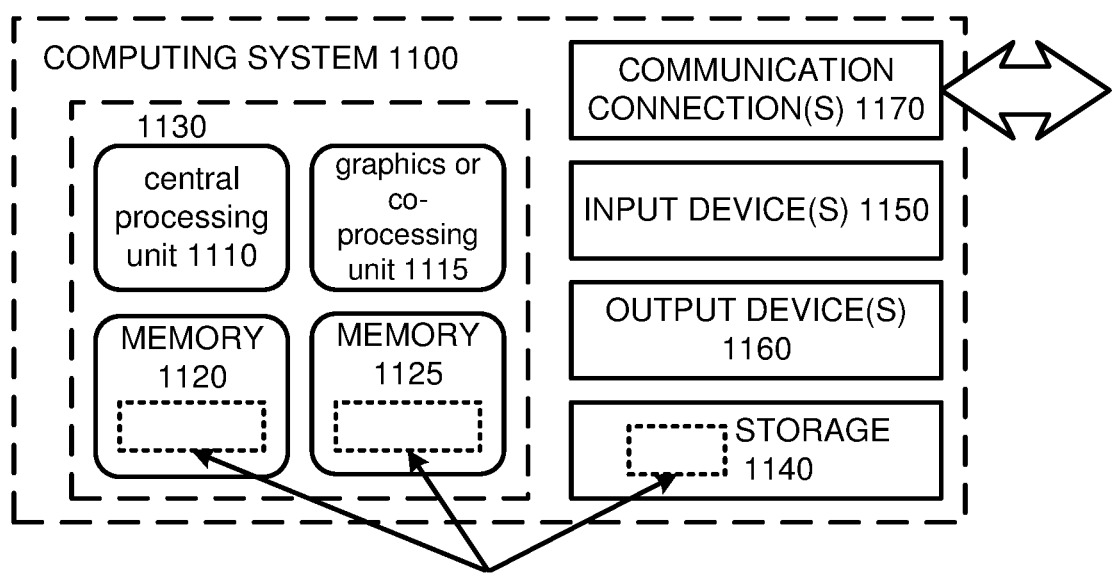
FIG. 11 is a block diagram illustrating an example computing device in conjunction with which techniques and tools described herein may be implemented.

FIG. 11 illustrates a generalized example of a suitable computing environment 1100 in which described embodiments, techniques, and technologies may be implemented. The computing environment 1100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information and which can be accessed within the computing system 1100. The storage 1140 stores instructions for the software 1180, which can implement technologies described herein.

The input device(s) 1150 may be a touch input device, such as a keyboard, keypad, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 11, computer-readable storage media include memory 1120 and/or storage 1140. The term computer-readable storage media does not include signals and carrier waves. In addition, the term computer-readable storage media does not include communication connections, such as 1170.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by a computing device, for creating multi-tenant identifiers within a multi-tenant environment, the method comprising:
    receiving, from a source system, a document having a source system identifier, wherein the source system identifier is a single-tenant identifier associated with the source system, and the source system identifier identifies a data system storing the document;
    determining a source identity provider of the source system, wherein the source identity provider uniquely identifies a combination of the source system identifier and an identity provider used by the source system;
    replacing the source system identifier with a multi-tenant identifier, wherein the multi-tenant identifier is a unique identifier across multiple database systems and replacing the source system identifier with the multi-tenant identifier includes creating a multi-tenant identifier that maps to a combination of the source system identifier and the source identity provider;
    storing the created multi-tenant identifier in association with the combination of the source system identifier and the source identity provider in a data store of the multi-tenant environment; and
    referencing the document by the multi-tenant identifier.

2. The method of claim 1, wherein the creating and storing are performed in response to determining that the combination of the source system identifier and the source identity provider is not present in the data store of the multi-tenant environment.

3. The method of claim 1, wherein the source system identifier is a unique identifier used at the source system, and wherein the source system identifier comprises a name and a value.

4. The method of claim 1, wherein the multi-tenant identifier does not comprise the source system identifier, and wherein the multi-tenant identifier does not comprise the source identity provider.

5. The method of claim 1, further comprising:
associating the created multi-tenant identifier with data received from the source system.

6. The method of claim 1, further comprising:
receiving, from the source system, metadata describing an external content item stored at the source system, wherein the source system identifier is associated with an element of the metadata; and
replacing a value of the source system identifier with the created multi-tenant identifier for identifying the element within the multi-tenant environment.

7. The method of claim 1, wherein the source identity provider uniquely identifies the source system and an identity provider used by the source system.

8. The method of claim 1, wherein the created multi-tenant identifier is stored in a multi-tenant identifier mapping table, and wherein entries in the multi-tenant identifier mapping table comprise:
a multi-tenant identifier field;
a source identity provider field;
a source system identifier name field; and
a source system identifier value field.

9. The method of claim 1, further comprising:
receiving source system identifiers from one or more other source systems; and
creating and storing multi-tenant identifiers from the source system identifiers from the one or more other source systems;
wherein the created multi-tenant identifiers are unique within the multi-tenant environment across the source system and the one or more other source systems.

10. A computing device operating within a multi-tenant environment, the computing device comprising:
a processing unit; and
memory;
the processing unit executing computer instructions performing operations for creating multi-tenant identifiers within the multi-tenant environment, the operations comprising:
receiving, from a source system, a document having a source system identifier, wherein the source system identifier is a single-tenant identifier associated with the source system, and the source system identifier identifies a data system storing the document;
determining a source identity provider of the source system, wherein the source identity provider uniquely identifies a combination of the source system identifier and an identity provider used by the source system;
replacing the source system identifier with a multi-tenant identifier, wherein the multi-tenant identifier is a unique identifier across multiple database systems and replacing the source system identifier with the multi-tenant identifier includes creating a multi-tenant identifier that maps to a combination of the source system identifier and the source identity provider;
storing the created multi-tenant identifier in association with the combination of the source system identifier and the source identity provider in a data store of the multi-tenant environment; and
referencing the document by the multi-tenant identifier.

11. The computing device of claim 10, wherein the creating and storing are performed in response to determining that the combination of the source system identifier and the source identity provider is not present in the data store of the multi-tenant environment.

12. The computing device of claim 10, wherein the source system identifier is a unique identifier used at the source system, and wherein the source system identifier comprises a name and a value.

13. The computing device of claim 10, the operations further comprising:
receiving, from the source system, metadata describing an external content item stored at the source system, wherein the source system identifier is associated with an element of the metadata; and
replacing a value of the source system identifier with the created multi-tenant identifier for identifying the element within the multi-tenant environment.

14. The computing device of claim 10, wherein the source identity provider uniquely identifies the source system and an identity provider used by the source system.

15. The computing device of claim 10, wherein the created multi-tenant identifier is stored in a multi-tenant identifier mapping table, and wherein entries in the multi-tenant identifier mapping table comprise:
a multi-tenant identifier field;
a source identity provider field;
a source system identifier name field; and
a source system identifier value field.

16. A computer-readable storage medium storing computer-executable instructions for causing a computing device to perform operations for using multi-tenant identifiers within a multi-tenant environment, the operations comprising:
receiving a request to lookup a document having a multi-tenant identifier, wherein the document is from a source system having a source system identifier, associated with a source system, in a multi-tenant identifier mapping table, the source system identifier identifies a data system storing the document, and the multi-tenant identifier is a unique identifier across multiple database systems;
determining a source identity provider of the source system, wherein the source identity provider uniquely identifies a combination of the source system identifier and an identity provider used by the source system;
identifying an entry in the multi-tenant identifier mapping table with the source system identifier and the source identity provider;
returning a multi-tenant identifier associated with the identified entry in the multi-tenant identifier mapping table, wherein the multi-tenant identifier is unique within the multi-tenant environment; and
returning the document having the multi-tenant identifier.

17. The computer-readable storage medium of claim 16, wherein the source system identifier is a unique identifier used at the source system, and wherein the source system identifier comprises a name and a value.

18. The computer-readable storage medium of claim 16, the operations further comprising:
- receiving, from the source system, metadata describing an external content item stored at the source system, wherein the source system identifier is associated with an element of the metadata; and
- replacing a value of the source system identifier with the returned multi-tenant identifier for identifying the element within the multi-tenant environment.

19. The computer-readable storage medium of claim 16, wherein the source identity provider uniquely identifies the source system and an identity provider used by the source system.

20. The computer-readable storage medium of claim 16, wherein the entries in the multi-tenant identifier mapping table comprise:
- a multi-tenant identifier field;
- a source identity provider field;
- a source system identifier name field; and
- a source system identifier value field.

* * * * *